United States Patent
Sahinoglu et al.

(10) Patent No.: US 6,759,946 B2
(45) Date of Patent: Jul. 6, 2004

(54) HOME APPLIANCES NETWORK

(75) Inventors: Zafer Sahinoglu, Clifton, NJ (US); George Fang, Summit, NJ (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

(21) Appl. No.: 10/007,872

(22) Filed: Dec. 6, 2001

(65) Prior Publication Data

US 2003/0107476 A1 Jun. 12, 2003

(51) Int. Cl.[7] ............................................. H04M 11/04
(52) U.S. Cl. ........................ 340/310.01; 340/310.02; 340/310.08; 375/259; 379/90.01; 379/107.06
(58) Field of Search .......... 340/310.01, 310.02–310.08; 375/259; 379/90.01, 107.06

(56) References Cited

U.S. PATENT DOCUMENTS

| | | | |
|---|---|---|---|
| 4,442,319 A | * 4/1984 | Treidl ..................... | 379/102.03 |
| 5,051,720 A | 9/1991 | Kittirutsunetorn .......... | 340/310 |
| 5,777,545 A | 7/1998 | Patel et al. ............ | 340/310.06 |
| 5,805,053 A | 9/1998 | Patel et al. ............ | 340/310.01 |
| 6,005,476 A | * 12/1999 | Valiulis .................. | 340/310.01 |
| 6,084,758 A | 7/2000 | Clarey et al. ................. | 361/62 |
| 6,175,860 B1 | * 1/2001 | Gaucher ..................... | 709/208 |
| 6,218,931 B1 | 4/2001 | Agshar et al. ........... | 340/310.2 |
| 6,229,433 B1 | * 5/2001 | Rye et al. .............. | 340/310.01 |
| 6,246,868 B1 | 6/2001 | Bullock et al. ............ | 455/402 |
| 6,288,632 B1 | 9/2001 | Hoctor et al. .......... | 340/310.01 |
| 6,404,773 B1 | * 6/2002 | Williams et al. ............ | 370/463 |
| 2002/0011923 A1 | * 1/2002 | Cunningham et al. . | 340/310.01 |

* cited by examiner

Primary Examiner—Daniel J. Wu
Assistant Examiner—Son Tang
(74) Attorney, Agent, or Firm—Dirk Brinkman; Andrew Curtin

(57) ABSTRACT

A network enables remote users to communicate with, and to control a variety of devices whose only electrical connection is to a power line network. In hybrid networks, communications between different network domains is only available if proper message mapping is done. Message mapping leads to the determination of correct frame conversion based on the specifications of protocols identifying different networks. This invention comprises a method that does bi-directional conversion between application level information entered into the remote access device by the user and related physical layer power line communications frames.

7 Claims, 3 Drawing Sheets

US 6,759,946 B2

HOME APPLIANCES NETWORK

FIELD OF THE INVENTION

This invention relates generally to devices connected to AC power lines, and more particularly to communication information between wireless telephone devices, Internet devices, and home appliances.

BACKGROUND OF THE INVENTION

There is a great interest in communicating information with devices connected to AC power lines. More particularly, users would like to control and sense home appliances remotely. Currently, it is possible to transmit and receive computer, television, and telephone signals on AC power lines. In the future, users would also like to be able to monitor and control thermostats, refrigerators, stoves, lighting fixtures, heating and cooling systems, and the like, while away from their homes.

In such arrangements, one or more appliances, e.g., PCs, televisions, telephones, stereos, would be connected to the AC power line for receiving power, and a power line communication (PLC) adapter could be used for receiving and transmitting the information signals. The PLC adapter can be embedded in the appliances to extract information signals from the AC power line.

Most prior art literature describing power line communication networks has mainly been concerned with the physical layer specification of power line communication (PLC) protocols. For example, the art has focused on modulators, demodulators, converters, filters, signal detectors, synchronizers, and the like.

In addition, most prior art systems only permit communication between like devices, or communicating to a specific class of devices, for example, only between telephone, only between audio monitors, only to NTSC type devices, and so forth.

U.S. Pat. No. 5,777,545 "Remote control apparatus for power line communications system," issued to Patel, et al. on Jul. 7, 1998, describes a remote control device for a power line communications system that uses pulse code modulation.

U.S. Pat. No. 5,805,053 "Appliance adapted for power line communications," issued to Patel, et al on Sep. 8, 1998, describes electrical appliances receiving and transmitting information to each other over a power line. The arrangement uses a transformer, bandpass filter, and amplifier and shaper.

U.S. Pat. No. 6,084,758 "Power distribution system with circuit breakers remotely resettable by signals transmitted over the power lines," issued to Clarey et al. on Jul. 4, 2000, describes a power distribution system where circuit breakers at a load center are remotely reset by reclosers using a power line communication system, such as an X10 or CEBus system. A remote master unit, which generates reset signals, is connected to an unaffected branch circuit, preferably by plugging into an accessible location remote from the affected load center. The reclosers may be addressed individually or globally by the master unit.

U.S. Pat. No. 6,218,931, "Home-appliance network with nodes identified by direct-sequence spreading codes," issued to Asghar et al. on Apr. 17, 2001, describes a network interface that couples residential appliances into a code-division multiple access (CDMA) network to convey appliance control and status signals. A spreading-code generator generates the codes, and a spread mixer modulates a narrowband transmit signal with the spreading code that is then coupled into the physical medium of the network.

U.S. Pat. No. 6,246,868 "Conversion and distribution of incoming wireless telephone signals using the power line," issued to Bullock et al., on Jun. 12, 2001 describes a system where wireless signals are received, converted, and distributed over AC power lines to one or more telephone communication devices within a building, office or complex is disclosed. That system provides for the reception of PCS, cellular and/or satellite communication signals, and provides an interface to standard generally available telephone equipment. By making use of a power line carrier channel, telephone equipment located remote from standard telephone wiring can be accessed. Moreover, by distributing such received wireless signals over the power line a number of telephone devices can be used to receive the distributed signals. In addition, the system allows previously installed telephones to communicate over and with wireless communication devices. As a limitation, that system is only concerned with distributing telephony signals, and does not address the general problem of controlling and communicating with a variety of non-telephonic home appliances, and the problem of acquiring status information about the appliances.

U.S. Pat. No. 6,288,632 "Apparatus and method for power line communication (PLC)," issued to Hoctor, et al. on Sep. 11, 2001, provides a transmitter that broadcasts a signal for communicating information over a power line. The signal includes a superset, and the superset includes tone sets. Specifically, the signals of the tone sets are characterized by a spectral shape exhibiting main lobes within a harmonic interval. There is a main lobe for each different tone set.

Recently, IBM has described a software toolkit called the Service Management Framework™, which is designed to be fully compliant with the OSGI (Open Service Gateway Initiative). The OSGI specification is an open industry standard for connecting "smart devices" to the Internet, including everything from home appliances and set-top boxes to game machines and medical devices. Thus, the connected devices can be operated remotely. Unfortunately, that tool kit does not address the general problem of devices that only have a connection with a power line.

Therefore, there is a need for a system, method and network that enables remote users to communicate with and to control a variety of devices whose only electrical connection is to a power line network.

SUMMARY OF THE INVENTION

A network enables remote users to communicate with, and to control a variety of devices whose only electrical connection is to a power line network. In hybrid networks, communication between different network domains is only available if proper message mapping is done. Message mapping leads to the determination of correct frame conversion based on the specifications of protocols identifying different networks. This invention comprises a method that does bi-directional conversion between application level information entered into the remote access device by the user and related physical layer power line communications frames.

DETAILED DESCRIPTION OF THE PREFERRED EMBODIMENT

Network Architecture

Figure 1:
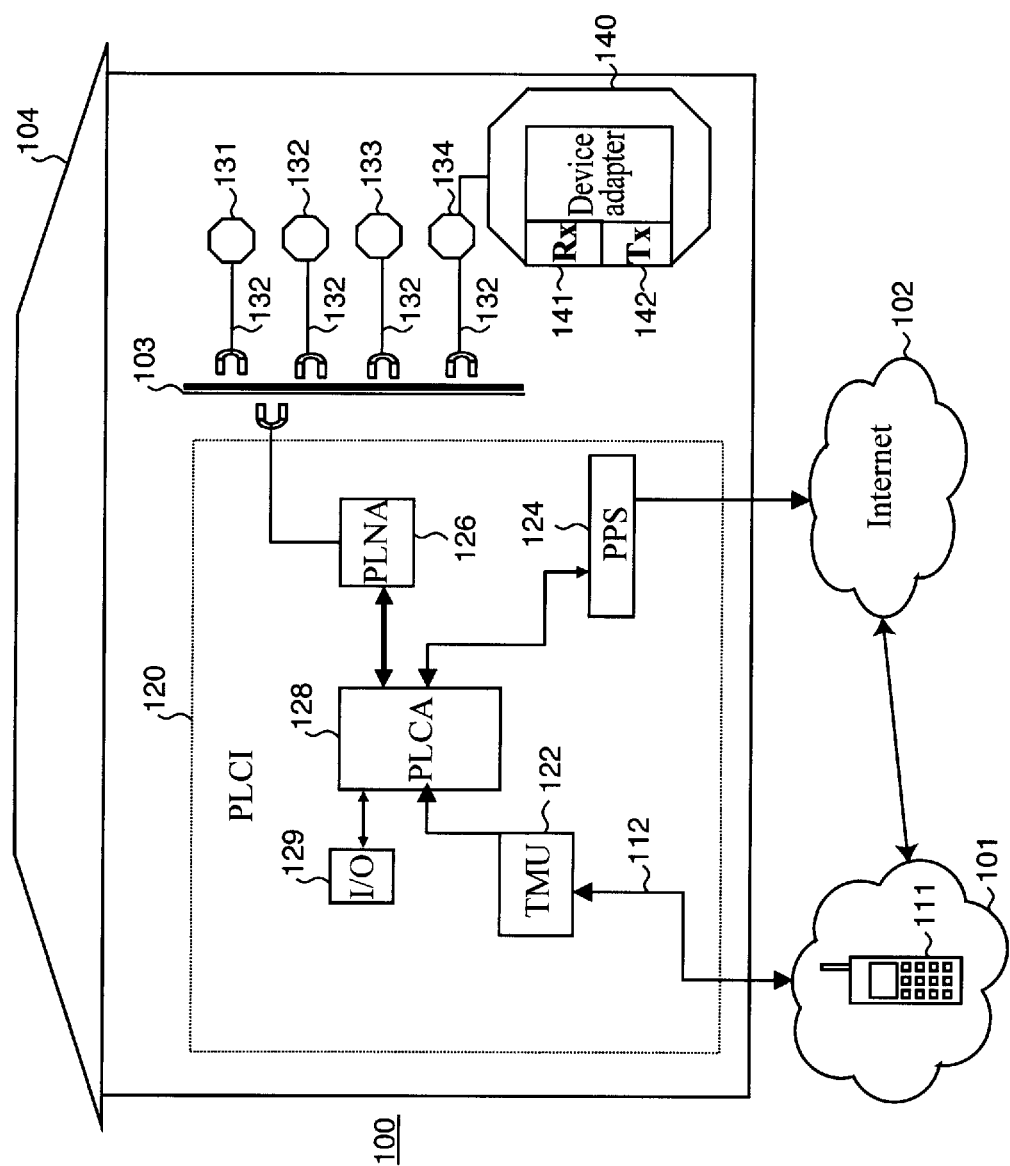
FIG. 1 is a block diagram of a home appliance network according to the invention.

FIG. 1 shows a home appliance network 100 according to the invention. The primary purpose of the network 100 is to allow users to control and exchange information with home appliances using remote access devices. A power line communication interface (PLCI) 120 integrates at least two distinct and different sub-networks that comprise the home appliance network 100 according to the invention: a local AC power line network (PLN) 103 with a telephone communication network 101, or the local AC power line network 103 with a wide area heterogeneous communication network 102, e.g., the Internet.

The telephone network 101 can include plain old telephone services (POTS) as well as remote access devices 111, e.g., cellular telephones. The structure and operation of the Internet 102 is well known. It is understood that the Internet can be accessed on a worldwide basis. The AC power line network (PLN) 103 for a home 104 is also well understood. Home appliances 131–134 are connected to the PLN 103.

Hereinafter, the term "home appliance" is used broadly to mean any power line communication device (PLCD) that connects to the AC PLN 103 and includes a device adapter 140. The device adapter 140 is configured to receive 141 and transmit 142 information on the PLN 103 using PLN frames, described in greater detail below. As a characteristic of the invention, the only electrical connection required for the PLCDs is a connection to the PLN 103, although it should be understood that some devices, such as televisions, may also have other connections, e.g., a cable TV network connection, however the present invention is not concerned with such other electrical connections.

The PLCI 120 includes a power line network adapter (PLNA) 126, and a tone-to-power line communication (PLC) frame mapping unit (TMU) 122 and a presentation page server (PPS) 124. The system also includes a power line communication adapter PLCA 128 with a graphical user interface 129 and external programming functionalities to be accessed by the user at home.

As shown in FIG. 1, all network elements are connected via the PLCA 128. The PLCI 120 performs as a network bridge between the TMU 122 and the PLNA 126, and between the PPS 124 and the PLNA 126. The PLCA 128 can also perform the same functions as the remote access device 111, and therefore includes the I/O interface 129. For example, the user of the system 100 can set and sense appliances properties while in the home 104.

Power Line Communication Frames

Figure 2:
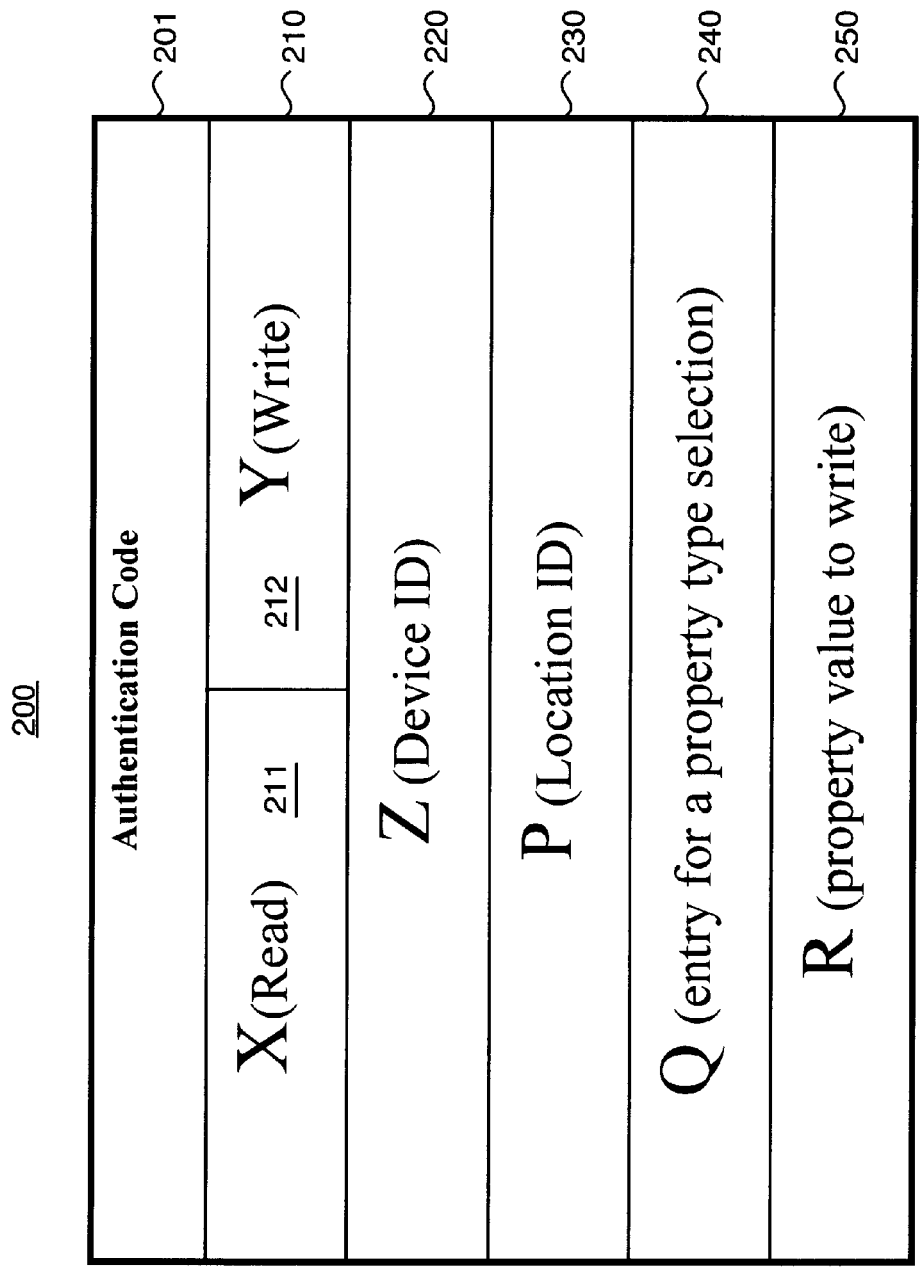
FIG. 2 is a block diagram of an application layer power line communication frame according to the invention.
Figure 3:
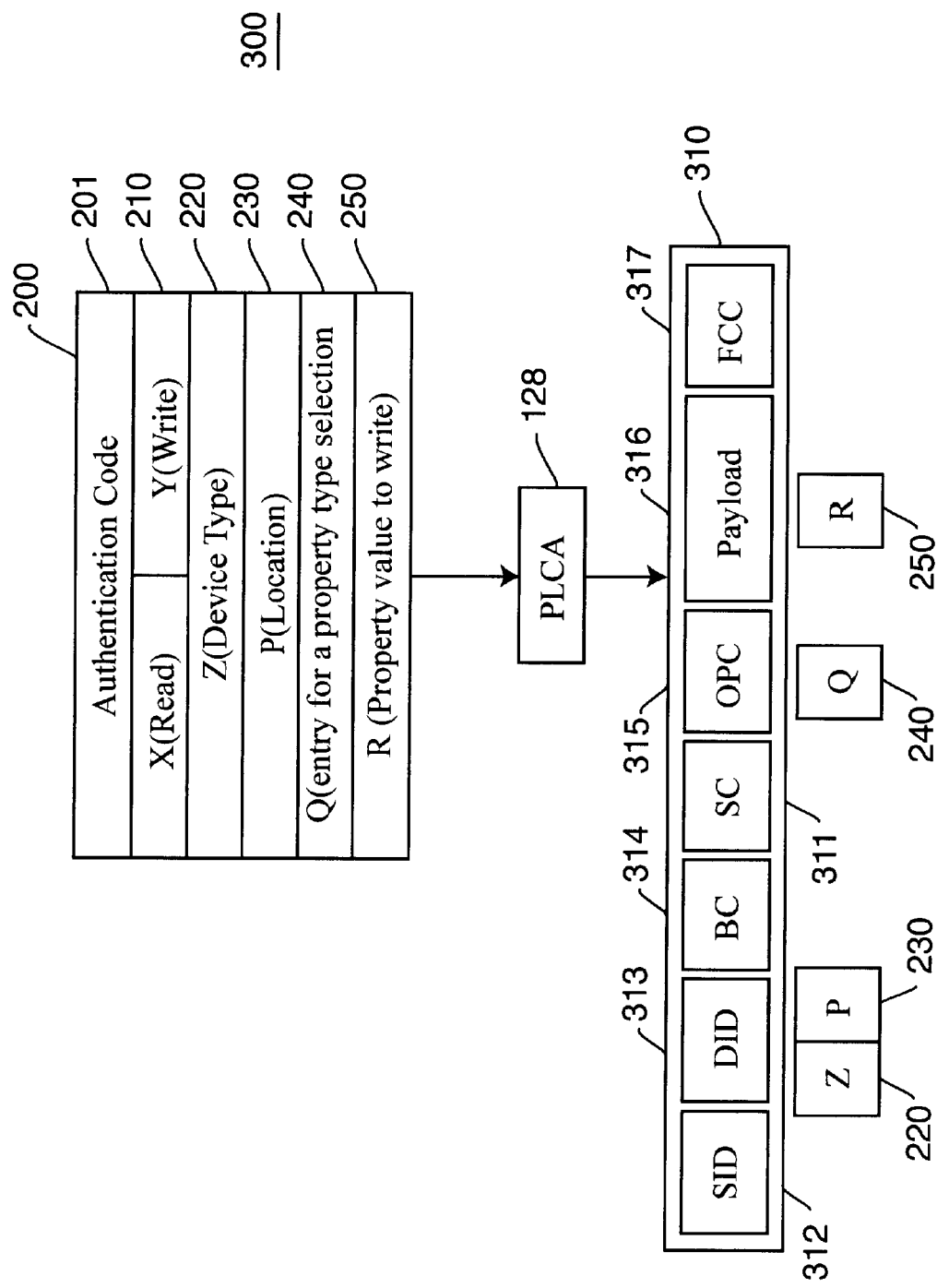
FIG. 3 is a block diagram of conversion between application layer powerline communication frames and physical layer power line network frames according to the invention.

The TMU 122 converts between tone frequencies and voice commands entered into the remote access device 111 by the user and PLC frames 200 as shown in FIGS. 2 and 3. The PLC frames are independent of the physical characteristics of the PLN 103, and therefore can be considered to compatible with an application layer of the network 100. The PLNA 128 can map PLC frames 200 to PLN frames 310 described below. The PLN frames are dependent on the physical layer of the PLN 103.

Each application layer PLC frame 200 according to the invention includes an authentication code field 201 as described below, this can be an ESN, or a personal user identification. In an action field 210, PLC frames are classified into two types: frames that read device values from a PLC device connected to the network 103, and frames that write values to a PLC device within the network 103. For example, the entry of "1" on a phone keypad is mapped to "read" actions 211, and the entry "2" is mapped to "write" actions 212.

A device ID field (Z) 220 selects a specific one of the home appliances 131–134 connected to the PLC network 103. Each class of the PLC devices 131–134, lamps, televisions, climate controller, security device, etc, has a set of associated properties such as, on/off status, thermostat settings, timer settings, etc. The home 104 may have several instances of the same PLC device, for example microwave ovens, at several locations. Therefore, for control of such devices independently from one another, a location ID (P) can be entered in field 230. The object property field (Q) 240 specifies the specific device property to be read or written, and the property value field (R) 250 contains the value to be read or written, for example 78 (degrees).

Power Line Network Frames

As shown in FIG. 3, the PLCA 128 converts PLC frames 200 to PLN frames 310. Each read or write action is inserted in a service code field (SC) 311 of the PLN frame 310. The PLN frame 300 also includes a source ID 312, a destination ID 313, a byte counter (BC) 314, an object property code (OPC) 315, and the value (Payload) 316 to write to the device if the action is a write action. Depending on the action and data value to write or read, frame sizes may change, hence the byte count field 314. The FCC 317 field provides a forward error correction code.

PLNA 126 broadcasts the PLN frame on the PLN 103, and waits for a response from a related one of the PLCDs 131–134. If the PLCI 120 does not include a PLCA 128, the frame conversion functionality 300 can be performed by the TMU 122 and/or the PLNA 126. If the communication is via the Internet 102, the frame conversion functionality 300 can be done by the PPS 124 and/or the PLNA 126, or entirely completed within the PPS 124. It is also possible to move the functionalities of TMU and PPS into the remote access device 111. In such a case, with proper selections from a menu available on the remote access device 111, the frame is generated and converted to the PLN 310 frame on the remote access device 111, and then the PLN frame is sent to the PLNA 126.

Network Protocols

The telephone network 101 can use any standard protocols including dual tone multi-frequency (DTMF) signals (touch tones) for signaling purposes, and CDMA for a carrier protocol on channel 112. The line 114 between the PLNA 126 and the PLCA 128 can use RS-232 or infrared signaling. The protocol on lines 132 uses a power line communication protocol (PLCP), described in greater detail below.

In the PLCP, the PLNA 126 sends the frame 310 to the PLN 103, and waits for a response and a result from the device 131–134 the frame is sent to. The response information is an acknowledgment (ACK) packet that is sent back to the PLNA 126 from the PLC device. If PLNA does not receive an ACK packet from the PLC device 131–134 within a specified time interval, e.g., several milliseconds, it is considered to be non-acknowledgment. It may be necessary to send the same frame several times to the PLC device from PLNA, or until an ACK is received from the device. After the ACK packet, the PLC device sends a second frame that is the "result frame." The "result frame" includes a value returned by the "read from" action.

Network Operation

During operation of the network 100, users can exchange data with the home appliances 131–134. The exchanged data can include status information, appliance settings, and commands. Status and settings information can include, for example, temperature readings, and thermostat setting. Other status information can include on/off status and timer information, and the commands to turn specific appliances on and off, initiate recording functions, and the like.

User Authentication

The user can initiate operations by calling a home telephone number associated with the PLCI 120. A connection is only established when a user authentication is successful. In a mobile telephone network, user authentication relates to a set of functions used to prevent fraudulent access to the network 101 by phones illegally programmed with counterfeit mobile identification (MIN) and electronic serial number (ESN) information. A successful outcome of authentication occurs when it can be demonstrated that the mobile phone 111 and the network 101 possess identical results of an independent calculation performed in both the cell phone and the network 101. If the remote access device 111 is not a cellular phone, authentication can be based on logging in with a predetermined and registered personal user identification stored in the TMU or PLCA. Note, the ESN or user identification can also be known to the TMU or PLCA so that access to the PLCI 120 is limited only to predetermined access devices.

The TMU 122 has some of the same capabilities as a standard telephone set. That is, the TMU can go "off-hook" upon detecting a ring signal. That is to say that the access device and TMU are activated to enable the user to communicate with the PLCI 120.

After the application layer PLC frame 200 is constructed, the TMU 122 sends the frame to the PLCA 128, and the PLCA converts the PLC frame 200 to the appropriate PLN frame 310 used on the lines 132 of the PLN 103. Note as a feature, the PLCI 120 can be used with any number of PLC protocols because the PLC frame 200 is constructed at an application level, independent of the physical layer of the PLC network 103. Thus only the PLNA 126 needs to aware of how the PLC network 103 is implemented, e.g. 60 HZ, 110 volt or 50 HZ 220 volt, or the specific modulation techniques that is used to provided a carrier signal on the power lines. Similarly, the PLCI 120 is insensitive to the structure and protocol of the telephone network 101, other than at the TMU 122. Thus, the PLCI 120 provides a universal application level interface that can be adapted anywhere, this is in contrast with prior art home network that is specific for a particular physical layer protocol.

In response to the broadcast of the frame, the associated PLC device adapter 140 processes the read/write actions specified in the frame. In the case of a read action, the PLC device constructs a response PLC frame, similar in structure, which travels back to the TMU 122, and the TMU maps the frame to signals that can be viewed or heard by the PLC access device 111. For example, temperature readings or timer values can be converted to text, audio signals, or graphical output.

Internet Access

In an alternative embodiment, the remote access device 111 includes an Internet browser support, and the PPS 124 has an Internet address. For example, the access device is an standard Internet enabled personal computer or wireless device, e.g., cell phone, PDA and the like. The remote access device 111 may also store a template presentation page for each type of home appliance. Upon detection of a new PLC device in the network 103, a new presentation page, with appropriate control buttons is constructed All active presentation pages maintained by the PPS 124 are periodically updated via the PLNA or PLCA. Any presentation page can be "uploaded' to the PLC remote access device 111 at any time. The user can browse through any device's presentation page, and perform read and write actions as described above, but now using a graphical user interface.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A home appliance network comprising:

a telephone communication network for communicating with a remote access device;

an AC power line network connected to power line communication devices via device adapters;

a power line communication interface configured to convert between application layer power line communication frames and physical layer power line network communication frames, the application layer power line communication frames communicated between the remote access device and the power line communication interface on the telephone communication network and the physical layer power line network communication frames communicated between the power line communication interface and the device adapters on the power line network, wherein the application layer power line communication frames communicated from the remote access device include an action field for identifying a selected one of a read action and a write action; and wherein each application layer power line communication frame further comprises:
an authentication field;
a device ID field;
a location ID field;
an object property field; and
a property value field.

2. The network of claim 1 wherein the remote access device is a wireless telephone including a graphical user interface for generating and displaying the application layer power line communication frames.

3. The network of claim 1 further comprising:

a tone-to-power line communication frame mapping unit converting tone frequencies and voice commands entered into the remote access device by a user to the application layer power line communication frames.

4. The network of claim 1 wherein the application layer power line communication frames are independent of physical characteristics of the power line network and the power line network frames are dependent on the physical characteristics of the power line network.

5. The network of claim 1 wherein each physical layer power line network communication frame further comprises:
a service code field,
a source ID;
a destination ID;
a byte counter;
an object property code; and
a payload value.

6. The network of claim 1 wherein a first application layer of power line communication frames is generated by the remote access device, the power line communication interface converts the first application layer of power line communication frames to a first physical layer power line network communication frame, and in response to the first physical layer power line network communication frame, the device adapter generates a second physical layer power line network communication frame, and the power line communication interface converts the second physical layer power line network communication frame to a second application layer power line communication frame for the remote access device.

7. The network of claim 1 further comprising a wide area network and wherein the remote access device communicates with the power line communication interface via a presentation page server.

* * * * *